United States Patent
Choi et al.

(10) Patent No.: US 10,439,221 B2
(45) Date of Patent: Oct. 8, 2019

(54) NEGATIVE ELECTRODE ACTIVE MATERIAL FOR LITHIUM SECONDARY BATTERY AND NEGATIVE ELECTRODE FOR LITHIUM SECONDARY BATTERY INCLUDING THE SAME

(71) Applicant: LG CHEM, LTD., Seoul (KR)

(72) Inventors: Hee Won Choi, Daejeon (KR); Sang Wook Woo, Daejeon (KR); Dong Sub Jung, Daejeon (KR); Dong Hyuk Kim, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 68 days.

(21) Appl. No.: 15/737,652

(22) PCT Filed: Dec. 23, 2016

(86) PCT No.: PCT/KR2016/015195
§ 371 (c)(1),
(2) Date: Dec. 18, 2017

(87) PCT Pub. No.: WO2017/111542
PCT Pub. Date: Jun. 29, 2017

(65) Prior Publication Data
US 2018/0190985 A1 Jul. 5, 2018

(30) Foreign Application Priority Data

Dec. 23, 2015 (KR) .................. 10-2015-0184809
Dec. 22, 2016 (KR) .................. 10-2016-0176723

(51) Int. Cl.
| | |
|---|---|
| *H01M 4/587* | (2010.01) |
| *H01M 4/133* | (2010.01) |
| *H01M 10/0525* | (2010.01) |
| *H01M 4/36* | (2006.01) |
| *H01M 4/525* | (2010.01) |
| *H01M 4/505* | (2010.01) |
| *H01M 10/052* | (2010.01) |
| *H01M 4/02* | (2006.01) |

(52) U.S. Cl.
CPC ........... *H01M 4/587* (2013.01); *H01M 4/133* (2013.01); *H01M 4/364* (2013.01); *H01M 4/366* (2013.01); *H01M 4/505* (2013.01); *H01M 4/525* (2013.01); *H01M 10/052* (2013.01); *H01M 10/0525* (2013.01); *H01M 2004/021* (2013.01); *H01M 2004/027* (2013.01); *H01M 2220/20* (2013.01); *Y02E 60/122* (2013.01)

(58) Field of Classification Search
CPC ....... H01M 4/133; H01M 4/583; H01M 4/587
See application file for complete search history.

(56) References Cited

U.S. PATENT DOCUMENTS

| | | | |
|---|---|---|---|
| 6,436,576 B1 | 8/2002 | Hossain | |
| 6,479,426 B2 | 11/2002 | Ryu et al. | |
| 6,482,547 B1 * | 11/2002 | Yoon | H01M 4/133 |
| | | | 429/218.1 |
| 7,749,659 B2 | 7/2010 | Shibuya et al. | |
| 7,829,222 B2 * | 11/2010 | Takei | H01M 4/133 |
| | | | 29/623.1 |
| 2001/0053743 A1 | 12/2001 | Ryu et al. | |
| 2002/0006551 A1 * | 1/2002 | Ryu | H01M 4/587 |
| | | | 429/231.8 |
| 2004/0170898 A1 | 9/2004 | Shibuya et al. | |
| 2007/0128518 A1 | 6/2007 | Uono et al. | |
| 2013/0122369 A1 | 5/2013 | Kim et al. | |
| 2017/0012280 A1 | 1/2017 | Ueda et al. | |

FOREIGN PATENT DOCUMENTS

| | | |
|---|---|---|
| JP | 09-27314 A | 1/1997 |
| JP | 10-158005 A | 6/1998 |
| JP | 2000-243397 A | 9/2000 |
| JP | 3084256 B2 | 9/2000 |
| JP | 2002-8661 A | 1/2002 |
| JP | 2003-323895 A | 11/2003 |
| JP | 2005/078829 A1 | 8/2005 |
| JP | 4403327 B2 | 1/2010 |
| JP | 2001-216241 A | 10/2011 |
| JP | 2013-030355 A | 2/2013 |
| JP | 2015-225792 A | 12/2015 |
| KR | 10-1283962 B1 | 7/2013 |
| KR | 10-2014-0147240 A | 12/2014 |
| WO | WO 2014/092141 A1 | 6/2014 |
| WO | WO 2015/147123 A1 | 10/2015 |

OTHER PUBLICATIONS

European Search Report for Appl. No. 16879409.7 dated Feb. 13, 2018.
International Search Report for PCT/KR2016/015195 (PCT/ISA/210) dated Mar. 29, 2017.

* cited by examiner

*Primary Examiner* — Jonathan Crepeau

(74) *Attorney, Agent, or Firm* — Birch, Stewart, Kolasch & Birch, LLP

(57) ABSTRACT

The present invention relates to a negative electrode active material for a lithium secondary battery, which includes (A) first artificial graphite having an average particle diameter (D50) of 15 μm to 20 μm and (B) second artificial graphite having an average particle diameter (D50) of 3 μm to 5 μm, wherein the first artificial graphite (A) includes a secondary artificial graphite particle, in which at least one primary artificial graphite particle is agglomerated, and a carbon coating layer, and a weight ratio of the first artificial graphite to the second artificial graphite is in a range of 85:15 to 95:5, a negative electrode including the same, and a lithium secondary battery including the negative electrode.

14 Claims, 2 Drawing Sheets

NEGATIVE ELECTRODE ACTIVE MATERIAL FOR LITHIUM SECONDARY BATTERY AND NEGATIVE ELECTRODE FOR LITHIUM SECONDARY BATTERY INCLUDING THE SAME

CROSS-REFERENCE TO RELATED APPLICATIONS

This application claims the benefit of Korean Patent Application Nos. 2015-0184809, filed on Dec. 23, 2015, and 10-2016-0176723, filed on Dec. 22, 2016, in the Korean Intellectual Property Office, the disclosure of which is incorporated herein in its entirety by reference.

TECHNICAL FIELD

The present invention relates to a negative electrode active material for a lithium secondary battery and a negative electrode for a lithium secondary battery including the same, and more particularly, to a negative electrode active material for a lithium secondary battery which includes two types of artificial graphite having a large particle diameter and a small particle diameter, and a negative electrode for a lithium secondary battery in which charge transfer resistance (CTR) is reduced by including the same.

BACKGROUND ART

In line with an increase in the price of energy sources due to the depletion of fossil fuels and amplification of interests in environmental pollution, environmentally-friendly alternative energy sources have become an indispensable factor for the future life.

In particular, the demand for secondary batteries as an environmentally-friendly alternative energy source has rapidly increased as the technology development and demand for mobile devices have increased.

Typically, lithium metal has been used as a negative electrode of the secondary battery, but, since a battery short circuit may occur due to the formation of dendrites and there is a risk of explosion due to the short circuit, the use of a carbon-base active material capable of reversibly intercalating and deintercalating lithium ions as well as maintaining structural and electrical properties has emerged.

Various types of carbon-based materials including artificial graphite, natural graphite, and hard carbon has been applied to the carbon-based active material, and, among these materials, a graphite-based active material, which may ensure life characteristics of a lithium secondary battery due to excellent reversibility, has been the most widely used. Since the graphite-based active material has a low discharge voltage versus lithium of −0.2 V, a battery using the graphite-based active material may exhibit a high discharge voltage of 3.6 V, and thus, the graphite-based active material provides many benefits in terms of energy density of the lithium battery.

Recently, in order to prepare a lithium secondary battery having excellent output characteristics at room temperature and low temperature, a method of reducing charge transfer resistance of lithium ions in a lithium secondary battery has emerged. For this purpose, a method of preparing an electrode active material with a nanometer size has been proposed. With respect to this method, ① high output characteristics may be obtained because a relative movement distance of lithium ions is reduced by the nano-sized active material, or ② a rapid electrochemical reaction may be expected because a contact with an electrolyte is facilitated due to a high surface area of the nano-sized active material. Furthermore, ③ an effect of improving a diffusion rate of lithium ions may be obtained because pores present between nano-sized active material particles provide a space for the expansion of the electrode active material.

However, in a case in which a nano-sized negative electrode active material is prepared, charge transfer resistance is increased due to polycrystallinity of the nanostructure, or intercalation and deintercalation reactions of lithium ions become difficult due to components (organic film, inorganic film) of cylindrical solid electrolyte interphase (SEI) formed on the surface of an electrode. Accordingly, since the charge transfer resistance is increased, it is disadvantageous in that degradation of lithium ion battery performance occurs.

Thus, there is a need to develop a graphite-based negative electrode active material having low resistance (high output) at room temperature and low temperature.

PRIOR ART DOCUMENT

Japanese Patent No. 4403327

DISCLOSURE OF THE INVENTION

Technical Problem

An aspect of the present invention provides a negative electrode active material for a lithium secondary battery which includes two types of artificial graphite having a large particle diameter and a small particle diameter.

Another aspect of the present invention provides a negative electrode including the negative electrode active material for a lithium secondary battery.

Another aspect of the present invention provides a lithium secondary battery including the negative electrode.

Technical Solution

According to an aspect of the present invention, there is provided a negative electrode active material for a lithium secondary battery including:

(A) first artificial graphite having an average particle diameter (D50) of 15 μm to 20 μm; and (B) second artificial graphite having an average particle diameter (D50) of 3 μm to 5 μm, wherein the first artificial graphite (A) includes a secondary artificial graphite particle, in which at least one primary artificial graphite particle is agglomerated, and a carbon coating layer formed on a surface of the secondary artificial graphite particle, and a weight ratio of the first artificial graphite to the second artificial graphite is in a range of 85:15 to 95:5.

An average particle diameter (D50) of the primary artificial graphite particle included in the first artificial graphite (A) may be in a range of 8 μm to 10 μm, and an average particle diameter (D50) of the secondary artificial graphite particle may be in a range of 14 μm to 20 μm.

A first pore by the agglomerated primary artificial graphite particles may be present in the secondary artificial graphite particle.

The secondary artificial graphite particle may have has a porosity of about 1% to about 20% and a Brunauer-Emmett-Teller (BET) specific surface area of 2 $m^2$/g to 10 $m^2$/g.

Also, a weight ratio of the secondary artificial graphite particle to the carbon coating layer included in the first artificial graphite (A) may be in a range of 70:30 to 95:5.

A second pore, as an empty space present between the carbon coating layer and the secondary artificial graphite particle which is formed by the agglomeration of the primary artificial graphite particles, may be present in the first artificial graphite (A).

The first artificial graphite (A) may have a porosity of about 5% to about 15% and a BET specific surface area of 2 m²/g to 30 m²/g.

Also, the negative electrode active material of the present invention may include a third pore depending on the particle diameters of the first artificial graphite (A) and the second artificial graphite (B).

The negative electrode active material may have a porosity of about 5% to about 20% and a BET specific surface area of 2 m²/g to 30 m²/g.

Furthermore, the negative electrode active material may have an average particle diameter (D50) of 12 μm to 20 μm, for example, 15 μm to 20 μm.

According to another aspect of the present invention, there is provided a negative electrode for a lithium secondary battery including:

a current collector; and a negative electrode material mixture layer coated on the current collector, wherein the negative electrode material mixture layer includes the negative electrode active material of the present invention.

According to another aspect of the present invention, there is provided a lithium secondary battery including a negative electrode, a positive electrode, a separator disposed between the negative electrode and the positive electrode, and an electrolyte, wherein the negative electrode includes the negative electrode of the present invention.

Advantageous Effects

According to the present invention, since a negative electrode active material, which includes two types of artificial graphite having a large particle diameter and a small particle diameter, is provided, a negative electrode having reduced charge transfer resistance (CTR) at high temperature and low temperature and a lithium secondary battery, in which output characteristics are improved due to the low resistance at room temperature and low temperature by including the negative electrode, may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
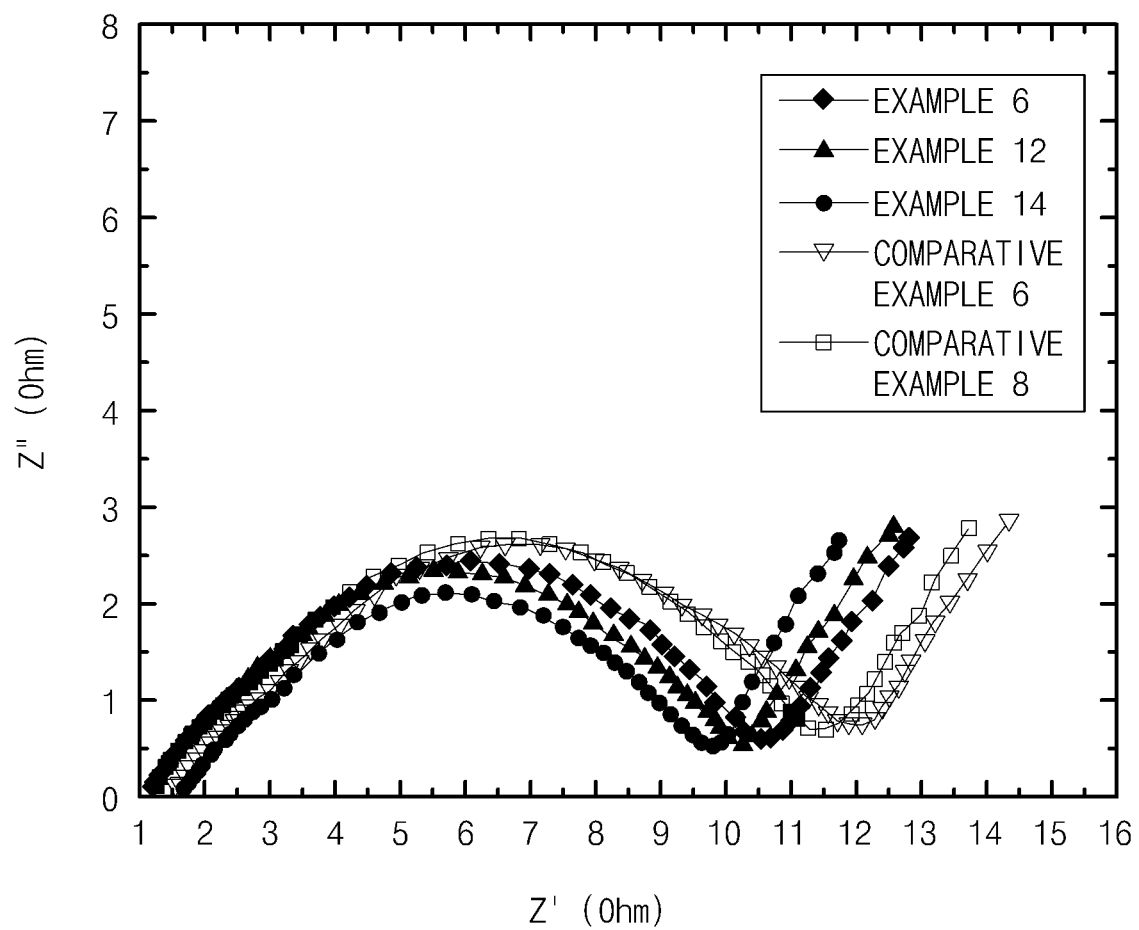
FIG. 1 is a graph illustrating the measurement results of charge transfer resistance values of lithium secondary batteries according to Experimental Example 1 of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, in the present invention, in order to reduce charge transfer resistance of an electrode, a negative electrode active material having a bimodal structure, in which two types of artificial graphite having different particle sizes are mixed, and a negative electrode including the same are provided.

Also, in the present invention, a lithium secondary battery including the negative electrode is provided.

Specifically, in an embodiment of the present invention, provided is a negative electrode active material for a lithium secondary battery including:

(A) first artificial graphite having an average particle diameter (D50) of 15 μm to 20 μm; and (B) second artificial graphite having an average particle diameter (D50) of 3 μm to 5 μm, wherein the first artificial graphite (A) includes a secondary artificial graphite particle, in which at least one primary artificial graphite particle is agglomerated, and a carbon coating layer formed on a surface of the secondary artificial graphite particle, and a weight ratio of the first artificial graphite to the second artificial graphite is in a range of 85:15 to 95:5.

(A) First Artificial Graphite

Specifically, in the negative electrode active material of the present invention, the first artificial graphite (A) having a large particle diameter may include a secondary artificial graphite particle (a') which is formed by agglomeration of at least one primary artificial graphite particle (a), and a carbon coating layer (b) coated on the surface of the secondary artificial graphite particle (a').

In this case, an average particle diameter (D50) of the primary artificial graphite particle (a) may be in a range of 8 μm to 10 μm.

In a case in which the average particle diameter of the primary artificial graphite particle (a) is less than 8 μm, an orientation index may be decreased and discharge capacity of the artificial graphite may be reduced. Also, in a case in which the average particle diameter of the primary artificial graphite particle (a) is greater than 10 μm, since an average particle diameter of the secondary artificial graphite particle (a') formed may be increased, rapid charging performance may be reduced.

Also, the secondary artificial graphite particle (a') may have an average particle diameter (D50) of 14 μm to 20 μm, for example, 17 μm.

In a case in which the average particle diameter of the secondary artificial graphite particle (a') is less than 14 μm, an orientation index may be decreased and discharge capacity of the artificial graphite may be reduced. Also, in a case in which the average particle diameter of the secondary artificial graphite particle is greater than 20 μm, it is disadvantageous in that the rapid charging performance is reduced while the orientation index is increased.

In this case, the average particle diameter (D50) of the primary artificial graphite particle and the secondary artificial graphite particle may be defined as a particle diameter at 50% in a cumulative particle diameter distribution. For example, the average particle diameter ($D_{50}$) of the artificial graphite particle according to an embodiment of the present invention may be measured by using a laser diffraction method. The laser diffraction method may generally measure a particle diameter ranging from a submicron level to a few mm, and may obtain highly repeatable and high resolution results.

Furthermore, since the secondary artificial graphite particle is composed of the agglomeration of the primary artificial graphite particles as described above, a first pore may be present in the secondary artificial graphite particle.

The first pore may be an empty space between the primary artificial graphite particles as described above and may have an arbitrary shape, and two or more first pores may be present. The first pore may have various shapes, for example, the first pore may extend to the surface of the secondary artificial graphite particle to be exposed to the outside or may be present only in the secondary particle.

Hard carbon or graphite, which is used as a conventional negative electrode active material, does not include pores, but, in the present invention, since the secondary artificial graphite particle, which is formed by the agglomeration of the primary artificial graphite particles, is included, the first pore, which is not present in the conventional negative electrode active material, may be included.

Since a contact area between the negative electrode active material and lithium ions may be further increased by the first pore, capacity characteristics and cycle life characteristics may be further improved.

The secondary artificial graphite particle including the first pore may have a porosity of about 1% to about 20%, for example, 2% to 10%. The porosity may be defined as a percentage of a volume occupied by all pores present in the secondary particle based on a total volume of the secondary particle.

The porosity of the secondary artificial graphite particle may be defined as follows:

Porosity=volume of pores per unit mass/(specific volume+volume of pores per unit mass)

The measurement of the porosity is not particularly limited, but, according to an embodiment of the present invention, the porosity, for example, may be measured by a Brunauer-Emmett-Teller (BET) method using adsorption gas, such as nitrogen, with BELSORP (BET instrument) by BEL JAPAN Inc., or mercury (Hg) porosimetry.

Also, the secondary artificial graphite particle may have a BET specific surface area. The BET specific surface area of the secondary particle may be in a range of 2 $m^2/g$ to 10 $m^2/g$. The secondary artificial graphite particle having a BET specific surface area within the above range may have excellent capacity characteristics and cycle life characteristics.

The specific surface area of the secondary artificial graphite particle may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

Furthermore, in order to further improve conductivity, the carbon coating layer (b) may be present on the surface of the secondary artificial graphite particle.

After providing at least one material selected from the group consisting of a secondary coal-tar pitch, rayon, and a polyacrylonitrile resin, or a precursor thereof to the surface of the secondary particle, the carbon coating layer may be formed by pyrolysis of the material or the precursor. Also, the carbon coating layer may be formed by chemical vapor deposition of carbon on the surface of the particle.

A weight ratio of the secondary artificial graphite particle to the carbon coating layer may be in a range of 70:30 to 95:5. If the amount of the secondary artificial graphite particle (a') is less than 70 wt % or the amount of the carbon coating layer (b) is greater than 30 wt %, an excessive amount of carbon having relatively lower crystallinity than graphite may be coated to reduce capacity of the negative electrode active material and press of the electrode may not be performed well because the artificial graphite particles are hardened by the carbon coating layer. Also, in general, when about 5 wt % of the carbon coating layer is formed, intercalation/deintercalation of lithium ions of the artificial graphite is facilitated and there is an effect of reducing charge transfer resistance of the lithium ions, but, if the amount of the secondary artificial graphite particle (a') is greater than 95 wt % or the amount of the carbon coating layer (b) is less than 5 wt %, there is a difficulty in lowering the charge transfer resistance of the lithium ions.

Furthermore, a second pore, as an empty space present between the carbon coating layer and the secondary artificial graphite particle which is formed by the agglomeration of the primary artificial graphite particles, may be present.

The second pore may be an empty space between the carbon coating layer and the secondary artificial graphite particles, in which the primary artificial graphite particles are agglomerated as described above, and two or more second pores may be present. The second pore may have various shapes, for example, the second pore may extend to the surface of the first artificial graphite (A) to be exposed to the outside or may be present only in the first artificial graphite.

The first artificial graphite (A) including the second pore may have a porosity of about 5% to about 15%. The porosity may be defined as a percentage of a volume occupied by all pores present in the first artificial graphite based on a total volume of the first artificial graphite.

Also, a BET specific surface area of the first artificial graphite (A) may be in a range of 2 $m^2/g$ to 30 $m^2/g$.

The porosity and specific surface area of the first artificial graphite (A) may be measured by the above-described method.

In the negative electrode active material of the present invention, after the primary artificial graphite particles are prepared, the first artificial graphite (A) may then be prepared by agglomerating the at least one primary artificial graphite particle (a) to be formed as a secondary particle, and mixing and heat treating the secondary particulate artificial graphite (a') and a carbon-based pitch.

In this case, in the obtaining of the secondary artificial graphite particle, when the primary artificial graphite particles are added to a reactor and the reactor is then operated, that is, when spinning the primary artificial graphite particles, the secondary artificial graphite particle may be formed by the agglomeration of the primary artificial graphite particles due to a centrifugal force.

Specifically, the first artificial graphite (A) of the present invention may be prepared by a method including:

conducting a coking process on a petroleum pitch, as a byproduct of petroleum extraction, to form needle coke-based artificial graphite;

performing a heat treatment of the formed needle coke-based artificial graphite at a high temperature of 3,000° C. or more to prepare graphitized primary artificial graphite particles;

preparing secondary artificial graphite particles by agglomeration of the primary artificial graphite particles; and mixing and heat treating the secondary artificial graphite particles and a carbon-based pitch to prepare first artificial graphite particles in which a carbon coating layer is formed on surfaces of the secondary artificial graphite particles.

In this case, during the coking process, a process of calcinating the byproduct between 1,300° C. and 1,600° C. may be performed.

Also, the process of performing the high-temperature heat treatment of the needle coke-based artificial graphite may be appropriately controlled depending on the size of the primary artificial graphite particles to be formed, and, specifically, primary artificial graphite particles having an average particle diameter (D50) of 8 μm to 10 μm may be prepared by heat treating in a temperature range of 3,000° C. to 5,000° C. for 1 minute to 5 hours.

Also, the agglomeration of the primary artificial graphite particles may be performed by adding a pitch and a resin binder together to a reactor and rotating the reactor at a speed of 2,000 rpm to 4,000 rpm, for example, 3,000 rpm at a temperature of about 1,400° C. to about 1,600° C., for example, 1,500° C.

The pitch is a component to improve an agglomeration effect of the primary artificial graphite particles, wherein the pitch may be added in an amount of 1 wt % to 10 wt % based on a total weight of the primary artificial graphite particles.

Also, the resin binder, as a component used during the preparation of a conventional electrode, is added in an amount of 1 wt % to 5 wt % based on the total weight of the primary artificial graphite particles. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

In this case, in the method, after obtaining the secondary artificial graphite particles, in which the primary artificial graphite particles are agglomerated, by spheronization of the primary artificial graphite particles, a heat treatment process may further be performed on the secondary artificial graphite particles. Since bonding and rearrangement between the primary artificial graphite particles may be possible by the above heat treatment process, a microstructure of the secondary artificial graphite particles may be improved. Conditions of the heat treatment process may vary depending on the size of the secondary artificial graphite particles to be formed, but, for example, may be selected within a temperature range of 1,000° C. to 3,000° C. for 1 hour to 10 hours in a reducing atmosphere and/or an inert atmosphere.

The heat treatment process for forming the carbon coating layer may be performed in a temperature range of 1,000° C. to 4,000° C.

In a case in which the heat treatment process is performed at a temperature of less than 1,000° C., formation of a uniform carbon coating layer may be difficult, and, in a case in which the heat treatment process is performed at a temperature of greater than 4,000° C., the carbon coating layer may be excessively formed in the heat treatment process.

The first artificial graphite (A) of the present invention prepared by the above method may have a large particle diameter in which the average particle diameter (D50) is in a range of 15 μm to 20 μm.

In a case in which the average particle diameter of the first artificial graphite is less than 15 μm, since the average particle diameter of the artificial graphite constituting the negative electrode active material becomes small, the discharge capacity may be reduced. In contrast, in a case in which the average particle diameter of the first artificial graphite is greater than 20 μm, since the particle size of the negative electrode active material is increased, room-temperature and low-temperature output performance of the negative electrode may be deteriorated.

(B) Second Artificial Graphite

Also, the second artificial graphite (B) having a small particle diameter included to prepare the negative electrode active material of the present invention, as a byproduct generated during the preparation of the first artificial graphite, is prepared in a similar manner as the method of preparing the first artificial graphite.

For example, after forming needle coke-based artificial graphite by conducting a coking process on a petroleum pitch as a byproduct of petroleum extraction, the second artificial graphite (B) is a byproduct having a small particle size and classified as a loss during the process among the primary artificial graphite particles generated after the graphitization through the heat treatment of the needle coke-based artificial graphite at a high temperature of 3,000° C. or more.

As described above, although the second artificial graphite (B) is subjected to the graphitization process, but the second artificial graphite (B) is in the form of a primary particle, has a small particle size, and has reduced irreversible capacity and initial efficiency depending on the particle size, and thus, the second artificial graphite (B) is a material that is not being used. In the present invention, since the second artificial graphite is used, preparation costs may be reduced.

In this case, an average particle diameter (D50) of the second artificial graphite (B) may be in a range of 3 μm to 5 μm, and, in a case in which the average particle diameter of the second artificial graphite is less than 3 μm, it is disadvantageous in that the reduction of the irreversible capacity rapidly occurs. Also, in a case in which the average particle diameter of the second artificial graphite is greater than 5 μm, the average particle diameter is increased, and, as a result, a charge transfer resistance reduction effect and an output performance improvement effect of fine artificial graphite having a small particle size are insignificant.

Negative Electrode Active Material

Also, the present invention provides a negative electrode active material including (A) first artificial graphite having an average particle diameter (D50) of 15 μm to 20 μm and (B) second artificial graphite having an average particle diameter (D50) of 3 μm to 5 μm in a weight ratio of 85:15 to 95:5.

In a case in which the amount of the first artificial graphite is 85 wt % or less, irreversible discharge capacity and initial efficiency may be reduced. In a case in which the amount of the first artificial graphite is greater than 95 wt %, since a blending ratio of the fine graphite is significantly decreased, it is considered that it is difficult to identify charge transfer resistance reduction effect and room-temperature output and low-temperature output performance improvement effect of the bimodal electrode.

Thus, in order to prevent the performance degradation, the negative electrode active material of the present invention may include the first artificial graphite having the above-described average particle diameter and amount.

Also, a third pore may be present in the negative electrode active material of the present invention depending on the particle diameters of the first artificial graphite (A) and the second artificial graphite (B).

The third pore may be an empty space between the first artificial graphite particles and the second artificial graphite particles as described above, and two or more third pores may be present. The third pore may have various shapes, for example, the third pore may extend to the surface of the negative electrode active material to be exposed to the outside or may be present only in the negative electrode active material.

The negative electrode active material of the present invention including the third pore may have a porosity of about 5% to about 20%.

Also, a BET specific surface area of the negative electrode active material may be in a range of 2 $m^2/g$ to 30 $m^2/g$.

In a case in which the specific surface area of the negative electrode active material is greater than 30 $m^2/g$, it may be difficult to control a side reaction with an electrolyte solution due to the large specific surface area. In a case in which the specific surface area of the negative electrode active material is less than 2 $m^2/g$, since sufficient pores are not formed in the negative electrode active material, it may be difficult for the negative electrode active material to effectively accommodate a volume expansion during charge and discharge with lithium.

Furthermore, the negative electrode active material has an average particle diameter of 12 μm to 20 μm, for example, 15 μm to 20 μm.

In a case in which the average particle diameter of the negative electrode active material is less than 12 μm, dispersion in a negative electrode active material slurry may be difficult or the negative electrode active material in the electrode may be agglomerated. In a case in which the average particle diameter of the negative electrode active material is greater than 20 μm, since a uniform reaction between the electrode active material and the lithium is difficult, life characteristics and thickness expansion suppression characteristics may be significantly reduced.

The negative electrode active material of the present invention may be prepared by adding the first artificial graphite and second artificial graphite to a TK mixer and mixing at a rate of 50 rpm (rotation per minute) or more.

Currently, in the preparation of a lithium secondary battery, the reduction of the charge transfer resistance is one of important challenges. In a case in which the charge transfer resistance is high, intercalation/deintercalation of lithium ions into and out of a negative electrode is generally not facilitated. In the present invention, in order to address this limitation, two types of artificial graphite having different particle sizes, for example, appropriate amounts of artificial graphite having a large particle diameter and artificial graphite having a small particle diameter, i.e., fine artificial graphite having a small particle size, are mixed to prepare a negative electrode active material having a bimodal structure, and an electrode, specifically, a negative electrode is prepared by using the negative electrode active material. Accordingly, since an effect of facilitating the intercalation/deintercalation of the lithium ions into and out of the negative electrode may be achieved by the artificial graphite having a small particle size, the charge transfer resistance of the lithium ions in the negative electrode may be reduced. Thus, an effect of improving the output characteristics of the secondary battery at room temperature and low temperature may be achieved.

Also, in an embodiment of the present invention, provided is a negative electrode for a lithium secondary battery including:

a current collector and a negative electrode material mixture layer coated on the current collector, wherein the negative electrode material mixture layer includes the negative electrode active material of the present invention.

In this case, a porosity in the negative electrode material mixture layer may be in a range of 20% or more, for example, 20% to 40%.

Specifically, an electrode collector is coated with a negative electrode active material slurry selectively including a binder, a conductive agent, and a solvent as well as a negative electrode active material and the negative electrode material mixture layer may then be prepared by drying and rolling the coated electrode collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to a positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

Also, as described above, the negative electrode active material may include the negative electrode active material of the present invention in which the two types of artificial graphite having different particle sizes are mixed.

Furthermore, the negative electrode active material may further include another active material capable of reversibly intercalating and deintercalating lithium in addition to the negative electrode active material of the present invention, specifically, at least one negative electrode active material selected from the group consisting of carbonaceous materials such as natural graphite and artificial graphite; lithium-containing titanium composite oxide (LTO); metals such as silicon (Si), tin (Sn), lithium (Li), zinc (Zn), magnesium (Mg), cadmium (Cd), cerium (Ce), nickel (Ni), or iron (Fe); alloys composed of the metals; oxides of the metals; and composites of the metals and carbon.

The negative electrode active material may be included in an amount of 80 wt % to 99 wt % based on a total weight of the negative electrode material mixture.

Also, the negative electrode material mixture layer may selectively further include at least one additive selected from the group consisting of a binder, a thickener, and a conductive agent.

The binder is a component that assists in the binding between the conductive agent, the active material, and the current collector, wherein the binder is commonly added in an amount of 1 wt % to 30 wt % based on the total weight of the negative electrode material mixture. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

Any thickener used in a typical lithium secondary battery may be used as the above thickener, and an example of the thickener may be carboxymethylcellulose (CMC).

The conductive agent is a component for further improving the conductivity of the negative electrode active material, wherein the conductive agent may be added in an amount of 1 wt % to 20 wt % based on the total weight of the negative electrode material mixture. Any conductive agent may be used without particular limitation so long as it has suitable conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include water or an organic solvent, such as N-methyl-2-pyrrolidone (NMP), and may be used in an amount such that desirable viscosity is obtained when the negative electrode active material as well as selectively the binder and the conductive agent is included. For example, the solvent may be included so that a concentration of solid content including the negative electrode active material as well as selectively the binder and the conductive agent is in a range of 50 wt % to 95 wt %, for example, 70 wt % to 90 wt %.

Furthermore, in an embodiment of the present invention, provided is a lithium secondary battery including:

the negative electrode, a positive electrode, a separator disposed between the negative electrode and the positive electrode, and an electrolyte, wherein the negative electrode includes the negative electrode of the present invention.

Specifically, the lithium secondary battery of the present invention may be prepared by injecting a non-aqueous electrolyte solution into an electrode assembly which is composed of a positive electrode, a negative electrode, and a separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode collector with a positive electrode active material slurry selectively including a binder, a conductive agent, and a solvent as well as a positive electrode active material, and drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiNn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}CO_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $O<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included so that a concentration of solid content including the positive electrode active material as well as selectively the binder and the conductive agent is in a range of 50 wt % to 95 wt %, for example, 70 wt % to 90 wt %.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery according to the present invention stably exhibits excellent discharge capacity, output characteristics, and capacity retention, the lithium secondary battery is suitable for portable devices, such as mobile phones, notebook computers, and digital cameras, and electric cars, such as hybrid electric vehicles (HEVs), and may be particularly suitable for a battery constituting a medium and large sized battery module. Therefore, the present invention may also provide a medium and large sized battery module including the above-described secondary battery as a unit cell.

The medium and large sized battery module may be suitable for power sources requiring high output and high capacity, such as an electric vehicle, a hybrid electric vehicle, and a power storage device.

Hereinafter, the present invention will be described according to examples and experimental examples. However, the following examples are merely presented to exemplify the present invention, and the scope of the present invention is not limited thereto.

EXAMPLES

[Negative Electrode Active Material Preparation]

Example 1

A coking process, in which a petroleum pitch, as a byproduct of petroleum extraction, was calcinated at 1,500° C., was conducted to form needle coke-based artificial graphite, and a heat treatment was performed thereon at 3,000° C. for 1 hour or more to prepare graphitized primary artificial graphite particles having an average particle diameter of 8 μm.

Subsequently, the primary artificial graphite particles, a pitch, and a binder (PVDF) (weight ratio of 98:1:1) were added to a mixing reactor and agglomerated while rotating the reactor at a speed of 3,000 rpm at 1,500° C. to prepare secondary artificial graphite particles having a diameter of 15 μm (porosity of 20%, BET specific surface area of 8 m$^2$/g).

Thereafter, the secondary artificial graphite particles and a carbon-based pitch were mixed in a weight ratio of 70:30 and heat-treated at 3,000° C. to prepare first artificial graphite (A) (porosity of 10%, BET specific surface area of 4 m$^2$/g) having an average particle diameter (D50) of 20 μm which included a carbon coating layer coated on a surface of the secondary artificial graphite particles.

Next, the first artificial graphite (A) having an average particle diameter (D50) of 20 μm and fine second artificial graphite (B) having an average particle diameter (D50) of 4 μm, as a byproduct generated during the heat treatment process for preparing the primary artificial graphite particles, were mixed in a weight ratio of 95:5 and subjected to a mixing process using a TK mixer to prepare a negative electrode active material (porosity of 20%, BET specific surface area of 7 m$^2$/g) having an average particle diameter (D50) of 16 μm (see Table 1 below).

Example 2

Primary artificial graphite particles having an average particle diameter of 10 μm were prepared in the same manner as in Example 1.

Subsequently, the primary artificial graphite particles, a pitch, and a binder (PVDF) (weight ratio of 98:1:1) were added to a mixing reactor and agglomerated while rotating the reactor at a speed of 3,200 rpm at 1,500° C. to prepare secondary artificial graphite particles having a diameter of 17 μm (porosity of 15%, BET specific surface area of 6 m$^2$/g).

Thereafter, the secondary artificial graphite particles and a carbon-based pitch were mixed in a weight ratio of 95:5 and heat-treated at 3,000° C. to prepare first artificial graphite (A) (porosity of 10%, BET specific surface area of 3 m$^2$/g) having an average particle diameter (D50) of 19 μm which included a carbon coating layer coated on a surface of the secondary artificial graphite particles.

Next, the first artificial graphite (A) having an average particle diameter (D50) of 19 μm and fine second artificial graphite (B) having an average particle diameter (D50) of 5 μm, as a byproduct generated during the heat treatment process for preparing the primary artificial graphite particles, were mixed in a weight ratio of 95:5 and subjected to a mixing process using a TK mixer to prepare a negative electrode active material (porosity of 10%, BET specific surface area of 5 m$^2$/g) having an average particle diameter (D50) of 16 μm (see Table 1 below).

Example 3

Primary artificial graphite particles having an average particle diameter of 8 μm were prepared in the same manner as in Example 1.

Subsequently, the primary artificial graphite particles, a pitch, and a binder (PVDF) (weight ratio of 98:1:1) were added to a mixing reactor and agglomerated while rotating the reactor at a speed of 2,900 rpm at 1,500° C. to prepare secondary artificial graphite particles having a diameter of 14 μm (porosity of 15%, BET specific surface area of 7 m$^2$/g).

Thereafter, the secondary artificial graphite particles and a carbon-based pitch were mixed in a weight ratio of 80:20 and heat-treated at 3,000° C. to prepare first artificial graphite (A) (porosity of 10%, BET specific surface area of 9 m$^2$/g) having an average particle diameter (D50) of 15 μm which included a carbon coating layer coated on a surface of the secondary artificial graphite particles.

Next, the first artificial graphite (A) having an average particle diameter (D50) of 15 μm and fine second artificial graphite (B) having an average particle diameter (D50) of 3 μm, as a byproduct generated during the heat treatment process for preparing the primary artificial graphite particles, were mixed in a weight ratio of 95:5 and subjected to a mixing process using a TK mixer to prepare a negative electrode active material (porosity of 10%, BET specific surface area of 5 m$^2$/g) having an average particle diameter (D50) of 15 μm (see Table 1 below).

Example 4

A negative electrode active material (porosity of 20%, BET specific surface area of 5 m$^2$/g) having an average particle diameter (D50) of 20 μm was prepared in the same manner as in Example 1 except that the first artificial graphite (A) having an average particle diameter (D50) of 20 μm and the fine second artificial graphite (B) having an average particle diameter (D50) of 4 μm were mixed in a weight ratio of 90:10 in Example 1 (see Table 1 below).

Example 5

A negative electrode active material (porosity of 20%, BET specific surface area of 5 m$^2$/g) having an average particle diameter (D50) of 20 μm was prepared in the same manner as in Example 1 except that the first artificial graphite (A) having an average particle diameter (D50) of 20 μm and the fine second artificial graphite (B) having an average particle diameter (D50) of 4 μm were mixed in a weight ratio of 85:15 in Example 1 (see Table 1 below).

Comparative Example 1

Primary artificial graphite particles having an average particle diameter of 8 μm were prepared in the same manner as in Example 1.

Subsequently, the primary artificial graphite particles, a pitch, and a binder (PVDF) (weight ratio of 98:1:1) were added to a mixing reactor and agglomerated while rotating the reactor at a speed of 2,900 rpm at 1,500° C. to prepare secondary artificial graphite particles having a diameter of 14 μm (porosity of 10%, BET specific surface area of 5 m$^2$/g).

Next, the secondary artificial graphite particles and a carbon-based pitch were mixed in a weight ratio of 70:30 and heat-treated at 3,000° C. to prepare first artificial graphite (A) (porosity of 20%, BET specific surface area of 4 m$^2$/g) having an average particle diameter (D50) of 20 μm which included a carbon coating layer coated on a surface of the secondary artificial graphite particles (see Table 1 below).

Comparative Example 2

A negative electrode active material (porosity of 10%, BET specific surface area of 3 m$^2$/g) having an average particle diameter (D50) of 22 μm was prepared in the same manner as in Example 1 except that the first artificial graphite (A) having an average particle diameter (D50) of 20 μm prepared in Comparative Example 1 and fine second artificial graphite (B) having an average particle diameter (D50) of 4 μm, as a byproduct generated during the heat treatment process for preparing the primary artificial graphite particles, were mixed in a weight ratio of 98:2 (see Table 1 below).

Comparative Example 3

A negative electrode active material (porosity of 10%, BET specific surface area of 4 m$^2$/g) having an average particle diameter (D50) of 20 μm was prepared in the same manner as in Comparative Example 1 except that the first artificial graphite (A) having an average particle diameter (D50) of 20 μm and the fine second artificial graphite (B) having an average particle diameter (D50) of 4 μm were mixed in a weight ratio of 82:18 in Comparative Example 2 (see Table 1 below).

Comparative Example 4

Primary artificial graphite particles having an average particle diameter of 8 μm were prepared in the same manner as in Example 1.

Subsequently, the primary artificial graphite particles, a pitch, and a binder (PVDF) (weight ratio of 98:1:1) were added to a mixing reactor and agglomerated while rotating the reactor at a speed of 3,200 rpm at 1,500° C. to prepare secondary artificial graphite particles having a diameter of 17 μm (porosity of 15%, BET specific surface area of 6 m$^2$/g).

Thereafter, the secondary artificial graphite particles and a carbon-based pitch were mixed in a weight ratio of 80:20 and heat-treated at 3,000° C. to prepare first artificial graphite (A) (porosity of 15%, BET specific surface area of 8 m$^2$/g) having an average particle diameter (D50) of 25 μm which included a carbon coating layer coated on a surface of the secondary artificial graphite particles.

Next, the first artificial graphite (A) having an average particle diameter (D50) of 25 μm and second artificial graphite (B) having an average particle diameter (D50) of 7 μm, as a byproduct generated during the heat treatment process for preparing the primary artificial graphite particles, were mixed in a weight ratio of 95:5 and subjected to a mixing process using a TK mixer to prepare a negative electrode active material (porosity of 10%, BET specific surface area of 6 m$^2$/g) having an average particle diameter (D50) of 19 μm (see Table 1 below).

Comparative Example 5

Primary artificial graphite particles having an average particle diameter of 8 μm were prepared in the same manner as in Example 1.

Subsequently, the primary artificial graphite particles, a pitch, and a binder (PVDF) (weight ratio of 98:1:1) were added to a mixing reactor and agglomerated while rotating the reactor at a speed of 2,700 rpm at 1,500° C. to prepare secondary artificial graphite particles having a diameter of 13 μm (porosity of 10%, BET specific surface area of 12 m$^2$/g).

Thereafter, the secondary artificial graphite particles and a carbon-based pitch were mixed in a weight ratio of 97:3 and heat-treated at 3,000° C. to prepare first artificial graphite (A) (porosity of 10%, BET specific surface area of 4 m$^2$/g) having an average particle diameter (D50) of 14 μm which included a carbon coating layer coated on a surface of the secondary artificial graphite particles.

Next, the first artificial graphite (A) having an average particle diameter (D50) of 14 μm and fine second artificial graphite (B) having an average particle diameter (D50) of 4 μm, as a byproduct generated during the heat treatment process for preparing the primary artificial graphite particles, were mixed in a weight ratio of 95:5 and subjected to a mixing process using a TK mixer to prepare a negative electrode active material (porosity of 10%, BET specific surface area of 5 m$^2$/g) having an average particle diameter (D50) of 16 μm (see Table 1 below).

[Secondary Battery Preparation]

Example 6

(Negative Electrode Preparation)

The negative electrode active material having an average particle diameter of 16 μm which was prepared in Example 1, Super C65 as a conductive agent, a styrene-butadiene rubber (SBR) as a binder, and carboxymethylcellulose (CMC), as a thickener, were mixed at a weight ratio of 95.9:1:1.9:1.2, and water was added thereto to prepare a negative electrode slurry.

Subsequently, a copper foil was coated with the negative electrode slurry to a thickness of 65 μm, vacuum-dried at about 130° C. for 8 hours, and rolled to prepare a negative electrode having an area of 1.4875 cm$^2$. In this case, the negative electrode was prepared such that loading was 3.60 mAh/cm$^2$.

(Secondary Battery Preparation)

A Li metal was used as a counter electrode with respect to the negative electrode, a polyolefin separator was disposed between the negative electrode and the Li metal, and a coin-type half cell was then prepared by injecting an electrolyte in which 1 M LiPF$_6$ was dissolved in a non-aqueous electrolyte solution solvent prepared by mixing ethylene carbonate (EC) and ethyl methyl carbonate (EMC) at a volume ratio of 3:7.

Example 7

(Negative Electrode Preparation)

The negative electrode active material having an average particle diameter of 16 μm which was prepared in Example 1, Super C65 as a conductive agent, a styrene-butadiene rubber (SBR) as a binder, and carboxymethylcellulose (CMC), as a thickener, were mixed at a weight ratio of 95.9:1:1.9:1.2, and water was added thereto to prepare a slurry.

Subsequently, a copper foil was coated with the slurry to a thickness of 65 μm using a coater, vacuum-dried at about 130° C. for 8 hours, and rolled to prepare a negative electrode having a mono-cell size. In this case, the mono-cell size of the negative electrode was 3.4 cm×5.1 cm. Also, the negative electrode was prepared such that loading was 3.60 mAh/cm$^2$.

(Secondary Battery Preparation)

The above-prepared bimodal-structured negative electrode and a positive electrode (LMO), as a counter electrode, were used, a polyolefin separator was disposed between the negative electrode and Li metal, and a two-electrode full cell was then prepared by injecting an electrolyte in which 0.7 M LiPF$_6$ and 0.3 M LIFSI were dissolved in a non-aqueous electrolyte solution solvent prepared by mixing ethylene carbonate (EC) and ethyl methyl carbonate (EMC) at a volume ratio of 3:7.

Example 8

A negative electrode and a coin-type half cell were prepared in the same manner as in Example 6 except that the negative electrode active material of Example 2 was used instead of the negative electrode active material of Example 1.

Example 9

A negative electrode and a two-electrode full cell were prepared in the same manner as in Example 7 except that the negative electrode active material of Example 2 was used instead of the negative electrode active material of Example 1.

Example 10

A negative electrode and a coin-type half cell were prepared in the same manner as in Example 6 except that the negative electrode active material of Example 3 was used instead of the negative electrode active material of Example 1.

Example 11

A negative electrode and a two-electrode full cell were prepared in the same manner as in Example 7 except that the negative electrode active material of Example 3 was used instead of the negative electrode active material of Example 1.

Example 12

A negative electrode and a coin-type half cell were prepared in the same manner as in Example 6 except that the negative electrode active material of Example 4 was used instead of the negative electrode active material of Example 1.

Example 13

A negative electrode and a two-electrode full cell were prepared in the same manner as in Example 7 except that the negative electrode active material of Example 4 was used instead of the negative electrode active material of Example 1.

Example 14

A negative electrode and a coin-type half cell were prepared in the same manner as in Example 6 except that the negative electrode active material of Example 5 was used instead of the negative electrode active material of Example 1.

Example 15

A negative electrode and a two-electrode full cell were prepared in the same manner as in Example 7 except that the negative electrode active material of Example 5 was used instead of the negative electrode active material of Example 1.

Comparative Example 6

A negative electrode and a coin-type half cell were prepared in the same manner as in Example 6 except that the negative electrode active material of Comparative Example 1 was used instead of the negative electrode active material of Example 1.

Comparative Example 7

A negative electrode and a two-electrode full cell were prepared in the same manner as in Example 7 except that the negative electrode active material of Comparative Example 1 was used instead of the negative electrode active material of Example 1.

Comparative Example 8

A negative electrode and a coin-type half cell were prepared in the same manner as in Comparative Example 6 except that the negative electrode active material of Comparative Example 2 was used instead of the negative electrode active material of Comparative Example 1.

Comparative Example 9

A negative electrode and a two-electrode full cell were prepared in the same manner as in Comparative Example 7 except that the negative electrode active material of Comparative Example 2 was used instead of the negative electrode active material of Comparative Example 1.

Comparative Example 10

A negative electrode and a coin-type half cell were prepared in the same manner as in Comparative Example 6 except that the negative electrode active material of Comparative Example 3 was used instead of the negative electrode active material of Comparative Example 1.

Comparative Example 11

A negative electrode and a two-electrode full cell were prepared in the same manner as in Comparative Example 7 except that the negative electrode active material of Comparative Example 3 was used instead of the negative electrode active material of Comparative Example 1.

Comparative Example 12

A negative electrode and a coin-type half cell were prepared in the same manner as in Comparative Example 6 except that the negative electrode active material of Comparative Example 4 was used instead of the negative electrode active material of Comparative Example 1.

Comparative Example 13

A negative electrode and a two-electrode full cell were prepared in the same manner as in Comparative Example 7 except that the negative electrode active material of Comparative Example 4 was used instead of the negative electrode active material of Comparative Example 1.

Comparative Example 14

A negative electrode and a coin-type half cell were prepared in the same manner as in Comparative Example 6 except that the negative electrode active material of Comparative Example 5 was used instead of the negative electrode active material of Comparative Example 1.

Comparative Example 15

A negative electrode and a two-electrode full cell were prepared in the same manner as in Comparative Example 7 except that the negative electrode active material of Comparative Example 5 was used instead of the negative electrode active material of Comparative Example 1.

C up to a state of charge (SOC) of 50%. Charge transfer resistances (Rct) of the coin-type half cells, which were charged up to a SOC of 50%, were measured by electrochemical impedance spectroscopy (EIS). In this case, as charge transfer resistance measurement conditions, a frequency was set to a range of $10^6$ Hz to 0.05 Hz. Generated Nyquist plots were illustrated in FIG. 1, the charge transfer resistances (Rct) were calculated from the plots using a fitting program, and the results thereof are summarized in the following Table 2. In this case, it is denoted that the smaller the diameter of semicircle is, the smaller the charge transfer resistance of lithium ions is.

TABLE 1

| Secondary battery | Negative electrode active material | First artificial graphite | | | | | | Average particle diameter (D50) of negative electrode active material |
|---|---|---|---|---|---|---|---|---|
| | | Average particle diameter (D50) of primary artificial graphite particles | Average particle diameter (D50) of secondary artificial graphite particles | Weight ratio of second artificial graphite:carbon coating layer | Average particle diameter (D50) of first artificial graphite | Average particle diameter (D50) of second artificial graphite | Mixing ratio of first artificial graphite:second artificial graphite | |
| Example 6 Example 7 | Example 1 | 8 μm | 15 μm | 70:30 | 20 μm | 4 μm | 95:5 | 16 μm |
| Example 8 Example 9 | Example 2 | 10 μm | 17 μm | 95:5 | 19 μm | 5 μm | 95:5 | 16 μm |
| Example 10 Example 11 | Example 3 | 8 μm | 14 μm | 80:20 | 15 μm | 3 μm | 95:5 | 15 μm |
| Example 12 Example 13 | Example 4 | 8 μm | 15 μm | 70:30 | 20 μm | 4 μm | 90:10 | 20 μm |
| Example 14 Example 15 | Example 5 | 8 μm | 15 μm | 70:30 | 20 μm | 4 μm | 85:15 | 20 μm |
| Comparative Example 6 Comparative Example 7 | Comparative Example 1 | 8 μm | 14 μm | 70:30 | 20 μm | — | — | 20 μm |
| Comparative Example 8 Comparative Example 9 | Comparative Example 2 | 8 μm | 14 μm | 70:30 | 20 μm | 4 μm | 98:2 | 22 μm |
| Comparative Example 10 Comparative Example 11 | Comparative Example 3 | 8 μm | 14 μm | 70:30 | 20 μm | 4 μm | 82:18 | 20 μm |
| Comparative Example 12 Comparative Example 13 | Comparative Example 4 | 8 μm | 17 μm | 80:20 | 25 μm | 7 μm | 95:5 | 19 μm |
| Comparative Example 14 Comparative Example 15 | Comparative Example 5 | 8 μm | 13 μm | 97:3 | 14 μm | 4 μm | 95:5 | 16 μm |

EXPERIMENTAL EXAMPLES

Experimental Example 1

3 cycles were performed by charging the coin-type half cells prepared in Examples 6, 12, and 14 and Comparative Examples 6 and 8 at 0.2 C to a voltage of 5 mV under constant current/constant voltage (CC/CV) conditions with a cut-off of 0.005 C, and discharging the coin-type half cells at a constant current (CC) of 0.2 C to a voltage of 1.0 V at 25° C., and the coin-type half cells were then charged at 0.2

TABLE 2

| | Charge transfer resistance (Rct (Ω)) |
|---|---|
| Example 6 | 8.56 |
| Example 12 | 8.30 |
| Example 14 | 8.05 |
| Comparative Example 6 | 9.85 |
| Comparative Example 8 | 9.83 |

Referring to Table 2 and FIG. 1, it may be understood that charge transfer resistance values of the coin-type half cells of Examples 6, 12, and 14 were about 8.56Ω or less, but charge transfer resistance values of the half cells of Comparative Examples 6 and 8 were about 9.83Ω or more. That is, it denoted that the coin-type half cells of Examples 6, 12, and 14 had lower resistance than the half cells of Comparative Examples 6 and 8.

Experimental Example 2

3 cycles were performed by charging the two-electrode full cells prepared in Examples 7, 13, and 15 and Comparative Examples 7, 9, 11, 13, and 15 at 0.2 C to a voltage of 5 mV under constant current/constant voltage (CC/CV) conditions with a cut-off of 0.005 C, and discharging the two-electrode full cells at a constant current (CC) of 0.2 C to a voltage of 1.0 V at 25° C., and the two-electrode full cells were then charged at 0.2 C up to a SOC of 50%. Charge transfer resistances (Rct) of the two-electrode full cells, which were charged up to a SOC of 50%, were measured by EIS. In this case, as charge transfer resistance measurement conditions, a frequency was set to a range of $10^6$ Hz to 0.05 Hz. Values of Z' (ohm) measured by the EIS were calculated using a fitting program, and the results thereof are presented in the following Table 3.

Also, a hybrid pulse power characterization (HPPC) test was performed on the two-electrode full cells respectively prepared in Examples 7, 13, and 15 and Comparative Examples 7, 9, 11, 13, and 15 at room temperature (25° C.) and low temperature (−10° C.) to measure resistance for each SOC. In this case, charge and discharge resistances of each lithium secondary battery were measured at every 5% step from 5% SOC to 95% SOC while the each secondary battery was charged at 2.5 C for 30 seconds from 5% SOC to 95% SOC, stabilized for 1 hour, and then discharged at 2 C for 30 seconds from 5% SOC to 95% SOC.

The measured resistance values at 50% SOC according to the charging at room temperature (25° C.) are presented in the following Table 3 and FIG. 2. Also, the resistance values at 50% SOC according to the discharging at low temperature (−10° C.) are presented in the following Table 3.

TABLE 3

|  | Charge transfer resistance (Rct (Ω)) | Room-temperature charge resistance (charge, 50% SOC (Ω)) | Low-temperature discharge resistance (discharge, 50% SOC (Ω)) |
| --- | --- | --- | --- |
| Example 7 | 4.58 | 1.88 | 11.16 |
| Example 13 | 4.61 | 1.91 | 11.14 |
| Example 15 | 4.75 | 2.02 | 11.25 |
| Comparative Example 7 | 4.86 | 2.10 | 11.48 |
| Comparative Example 9 | 4.88 | 2.12 | 11.45 |
| Comparative Example 11 | 4.82 | 2.05 | 11.32 |
| Comparative Example 13 | 4.92 | 2.06 | 11.35 |
| Comparative Example 15 | 4.93 | 2.19 | 11.42 |

Referring to Table 3, it may be confirmed that, at 50% SOC during the charging, the full cells of Examples 7, 13, and 15 had lower charge transfer resistance values than the full cells of Comparative Examples 7, 9, 11, 13, and 15.

Figure 2:
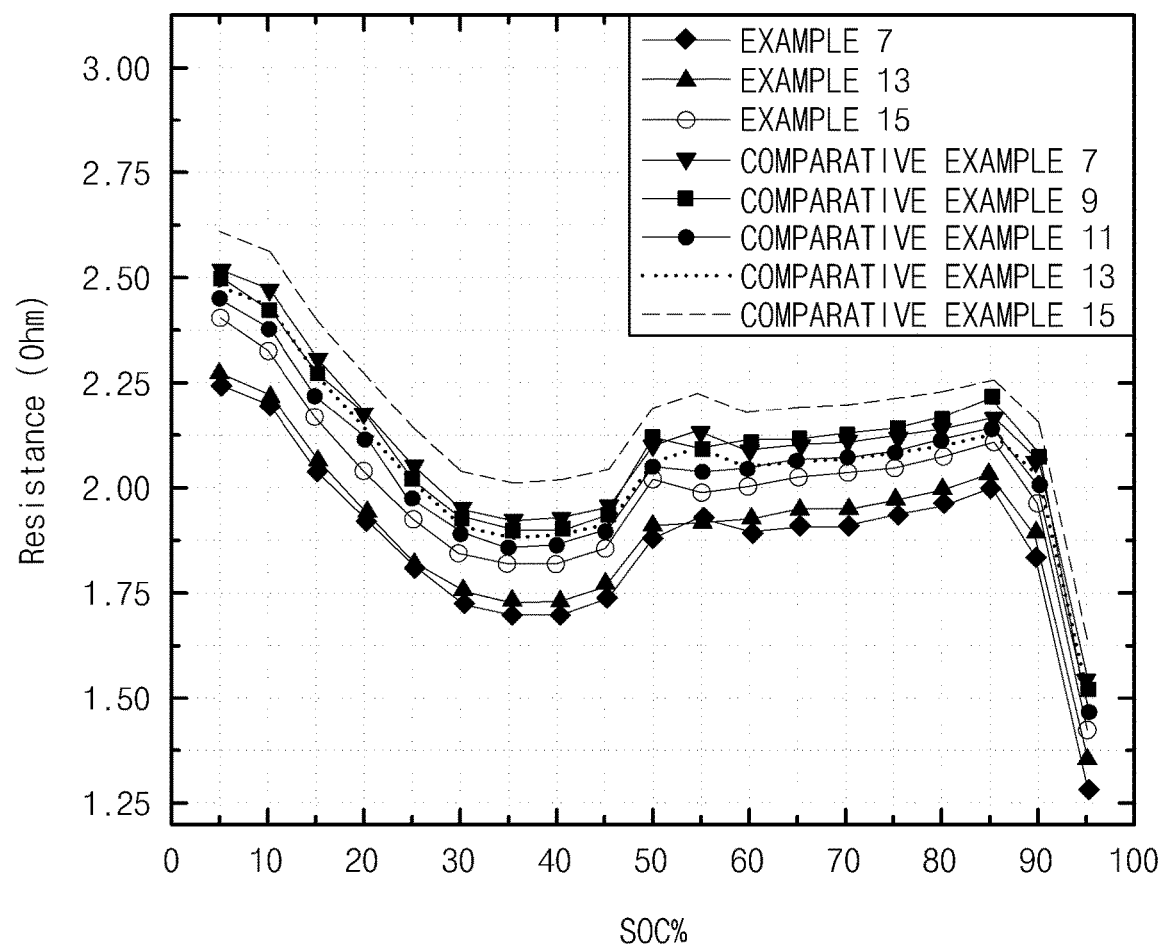
FIG. 2 is a graph illustrating the measurement results of output characteristics of lithium secondary batteries at room temperature according to Experimental Example 2 of the present invention.

Also, referring to Table 3 and FIG. 2, it may be understood that the resistance values at room temperature and low temperature of the full cells of Examples 7, 13, and 15 were lower than those of Comparative Examples 7, 9, 11, 13, and 15 (outputs were higher).

Thus, it was confirmed that output was further improved by providing the negative electrode active material according to the present invention which included the two types of artificial graphite having large particle diameter and small particle diameter, in comparison to a case of using a conventional negative electrode active material including one type of artificial graphite.

Specifically, with respect to the negative electrode active material of the present invention, if a difference in the particle sizes of the two types of negative electrode material particles is large enough, the resistance of the bimodal-structured electrode, in which the fine artificial graphite was mixed in the negative electrode active material, is reduced, and, accordingly, charge transfer resistance to the intercalation/deintercalation of lithium ions of the bimodal negative electrode is reduced. As a result, the optimized point where the output increases may be found. In the present experimental examples and examples, the charge transfer resistance of the bimodal-structured electrode, in which the small particle diameter artificial graphite (second artificial graphite) having a small particle size was mixed, was actually reduced, and, accordingly, it may be confirmed that output characteristics at room temperature and low temperature were improved.

The above descriptions are merely exemplary embodiments for implementing the negative electrode active material according to the present invention, the preparation method thereof, and the secondary battery including the negative electrode active material, so that the present invention is not limited thereto. The true scope of the present invention should be defined to the extent that those skilled in the art can make various modifications and changes thereto without departing from the scope of the invention, as defined by the appended claims.

The invention claimed is:

1. A negative electrode active material for a lithium secondary battery, the negative electrode active material comprising:
   (A) first artificial graphite having an average particle diameter (D50) of 15 μm to 20 μm; and
   (B) second artificial graphite having an average particle diameter (D50) of 3 μm to 5 μm,
   wherein the first artificial graphite (A) comprises a secondary artificial graphite particle, in which at least one primary artificial graphite particle is agglomerated, and a carbon coating layer formed on a surface of the secondary artificial graphite particle, and
   a weight ratio of the first artificial graphite to the second artificial graphite is in a range of 85:15 to 95:5.

2. The negative electrode active material for a lithium secondary battery of claim 1, wherein an average particle diameter of the primary artificial graphite particle included in the first artificial graphite (A) is in a range of 8 μm to 10 μm.

3. The negative electrode active material for a lithium secondary battery of claim 1, wherein an average particle diameter (D50) of the secondary artificial graphite particle included in the first artificial graphite (A) is in a range of 14 μm to 20 μm.

4. The negative electrode active material for a lithium secondary battery of claim 1, wherein the secondary artificial graphite particle has a porosity of 1% to 20%.

5. The negative electrode active material for a lithium secondary battery of claim 1, wherein the secondary artificial graphite particle has a Brunauer-Emmett-Teller (BET) specific surface area of 2 m²/g to 10 m²/g.

6. The negative electrode active material for a lithium secondary battery of claim 1, wherein a weight ratio of the secondary artificial graphite particle to the carbon coating layer included in the first artificial graphite (A) is in a range of 70:30 to 95:5.

7. The negative electrode active material for a lithium secondary battery of claim 1, wherein the first artificial graphite (A) has a porosity of 5% to 15%.

8. The negative electrode active material for a lithium secondary battery of claim 1, wherein the first artificial graphite (A) has a BET specific surface area of 2 m²/g to 30 m²/g.

9. The negative electrode active material for a lithium secondary battery of claim 1, wherein the negative electrode active material has a porosity of 5% to 20%.

10. The negative electrode active material for a lithium secondary battery of claim 1, wherein the negative electrode active material has a BET specific surface area of 2 m²/g to 30 m²/g.

11. The negative electrode active material for a lithium secondary battery of claim 1, wherein the negative electrode active material has an average particle diameter of 12 μm to 20 μm.

12. A negative electrode for a lithium secondary battery, the negative electrode comprising:
a current collector; and
a negative electrode material mixture layer coated on the current collector,
wherein the negative electrode material mixture layer comprises the negative electrode active material of claim 1.

13. The negative electrode for a lithium secondary battery of claim 12, wherein a porosity in the negative electrode material mixture layer is in a range of 20% to 40%.

14. A lithium secondary battery comprising:
a negative electrode;
a positive electrode;
a separator disposed between the negative electrode and the positive electrode; and
an electrolyte,
wherein the negative electrode comprises the negative electrode of claim 12.

* * * * *